UNITED STATES PATENT OFFICE.

LOUIS ENRICHT, OF NEW YORK, N. Y., ASSIGNOR TO THE ENRICHT MANUFACTURING COMPANY, OF SAME PLACE.

ARTIFICIAL STONE OR CEMENT.

SPECIFICATION forming part of Letters Patent No. 448,512, dated March 17, 1891.

Application filed May 16, 1890. Serial No. 352,070. (No specimens.)

*To all whom it may concern:*

Be it known that I, LOUIS ENRICHT, a citizen of the United States, residing at New York, in the county and State of New York, have invented new and useful Improvements in Artificial Stone or Cement, of which the following is a specification.

This invention relates to a composition of matter serviceable for use as artificial stone or cement, as set forth in the following specification and claim.

The composition consists of the following ingredients, in about the proportions named, by weight: aqueous solution of hydrochlorate of magnesia (magnesium chloride) of 35° Baumé, eight ounces; magnesium oxide, twenty ounces; ammonium chloride, one ounce; water, two ounces.

I have found it convenient to first dissolve the ammonium chloride in the water and then to add this solution to the remaining substances.

The substances are thoroughly mixed, and when the mixture is to be used as a cement it must be used while in a wet or plastic state. If the mixture is to be used for stone, said mixture is molded or shaped into the required form and then allowed to dry, whereby the mixture becomes set or hard and retains the required form.

At the ordinary temperature my composition hardens in from two to three days.

What I claim as new, and desire to secure by Letters Patent, is—

The above-described composition of matter to be used for stone or cement, consisting of magnesium chloride, magnesium oxide, ammonium chloride, and water, substantially as and in the proportions specified.

In testimony whereof I have hereunto set my hand in the presence of two subscribing witnesses.

LOUIS ENRICHT.

Witnesses:
   WM. C. HAUFF,
   E. F. KASTENHUBER.